US006573826B2

(12) United States Patent
Pan

(10) Patent No.: US 6,573,826 B2
(45) Date of Patent: Jun. 3, 2003

(54) WIRELESS COMMUNICATION SYSTEM BY USING ELECTRIC POWER LINE AS DATA LINK NETWORK

(76) Inventor: Yuan-Sheng Pan, 6F, No. 100, Hsingan St., Taipei (TW)

( * ) Notice: Subject to any disclaimer, the term of this patent is extended or adjusted under 35 U.S.C. 154(b) by 124 days.

(21) Appl. No.: 09/912,080

(22) Filed: Jul. 25, 2001

(65) Prior Publication Data

US 2003/0020606 A1 Jan. 30, 2003

(51) Int. Cl.[7] .............................................. H04M 11/04

(52) U.S. Cl. ........................... 340/310.01; 340/310.06; 340/825.2; 455/402

(58) Field of Search ....................... 340/310.01–310.08, 340/825.2; 455/402, 426, 462, 465; 379/90.01, 55.1; 375/356, 220

(56) References Cited

U.S. PATENT DOCUMENTS 4,583,090 A * 4/1986 Eden et al. ............ 340/825.07
4,815,106 A * 3/1989 Propp et al. .................. 375/36
5,127,045 A * 6/1992 Cragun et al. ................ 379/88
5,553,094 A * 9/1996 Johnson et al. ............. 375/200
5,844,949 A * 12/1998 Hershey et al. ............. 375/346
6,239,722 B1 * 5/2001 Colton et al. .......... 340/870.02
6,243,571 B1 * 6/2001 Bullock et al. ............. 455/402

* cited by examiner

*Primary Examiner*—Daniel J. Wu
*Assistant Examiner*—Phung Nguyen

(57) ABSTRACT

A wireless communication system by using an electric power line as a data link network is disclosed. The system includes a plurality of primary wireless communication modules, a plurality of secondary wireless communication modules. Each of the primary wireless communication modules includes a data communication device coupled to a data link port of a controller, and a filter coupled between the data communication device and the electric power line. The system status memories of the primary wireless communication modules are synchronized to each other by transmitting the system status data therebetween according to a predetermined communication protocol on a selected communication channel through the electric power line.

16 Claims, 4 Drawing Sheets

WIRELESS COMMUNICATION SYSTEM BY USING ELECTRIC POWER LINE AS DATA LINK NETWORK

BACKGROUND OF THE INVENTION

1. Field of the Invention

The present invention relates to a communication system, and more especially to a wireless communication system by using electric power line as data link network.

2. Description of the Prior Art

Traditional wireless communication system generally is equipped with a main tele or data switching unit. The main tele or data switching unit allows the individual communication units to connect to a subscriber line of a public telecommunication network system or a communication line of a data network system. The main switching units may communicate with a number of wireless handset units through a selected communication channel.

However, it is noted that the communication between the main switching units and/or wireless communication units is proceeded through a selected wireless communication channel. The system status data between the main switching units and/or wireless communication units is transmitted through the wireless communication channel. As a result, the synchronized processes between the main switching units and wireless communication units are complicated, and the working load between the main switching units and wireless communication units is heavy. Thus, it is required to provide a new communication configuration with an improved data link network for overcoming the problems occurred in the prior art.

SUMMARY OF THE INVENTION

Therefore, the primary object of the present invention is to provide a communication system with data link network over a current electric power line. The communication system includes a plurality of wireless communication modules linked with the electric power line serving as a data transmission medium. The wireless communication modules may communicate each other via the selected communication channel with a preset communication protocol.

Another purpose of the present invention is to provide a wireless communication system by using electric power line as data link network. The wireless communication system includes a plurality of primary wireless communication modules and secondary wireless communication modules linked by electric power line. The system status data between the primary wireless communication modules and/or the secondary wireless communication modules may be synchronized to each other by transmitting the system status data therebetween according to a predetermined communication protocol on a selected communication channel through the electric power line.

The other object of the present invention is to provide a distributed wireless communication system with data link network through a current electric power line. The wireless communication system includes a plurality of primary wireless communication modules and a plurality of secondary wireless communication modules. Each of the primary wireless communication modules includes a data communication device coupled to a data link port of a controller, and a filter coupled between the data communication device and the electric power line. The system status memories of the primary wireless communication modules are synchronized to each other by transmitting the system status data therebetween according to a predetermined communication protocol on a selected communication channel through the electric power line.

The communication system in accordance with a preferred embodiment of the present invention may be a public telecommunication network or a data network system. The system status data of the primary wireless communication modules and the secondary wireless communication modules may include the communication line using status and the system operation status thereof. Besides, the data communication device is a digital signal processing device (DSP) comprising DTMF, FSK, PSK, QAM, ASK, etc. The filter may be a high pass filter or a band pass filter.

BRIEF DESCRIPTION OF THE DRAWINGS

The present invention will be described in further detail with reference to the accompanying drawings, wherein.

DETAILED DESCRIPTION OF THE PREFERRED EMBODIMENTS

Figure 1:
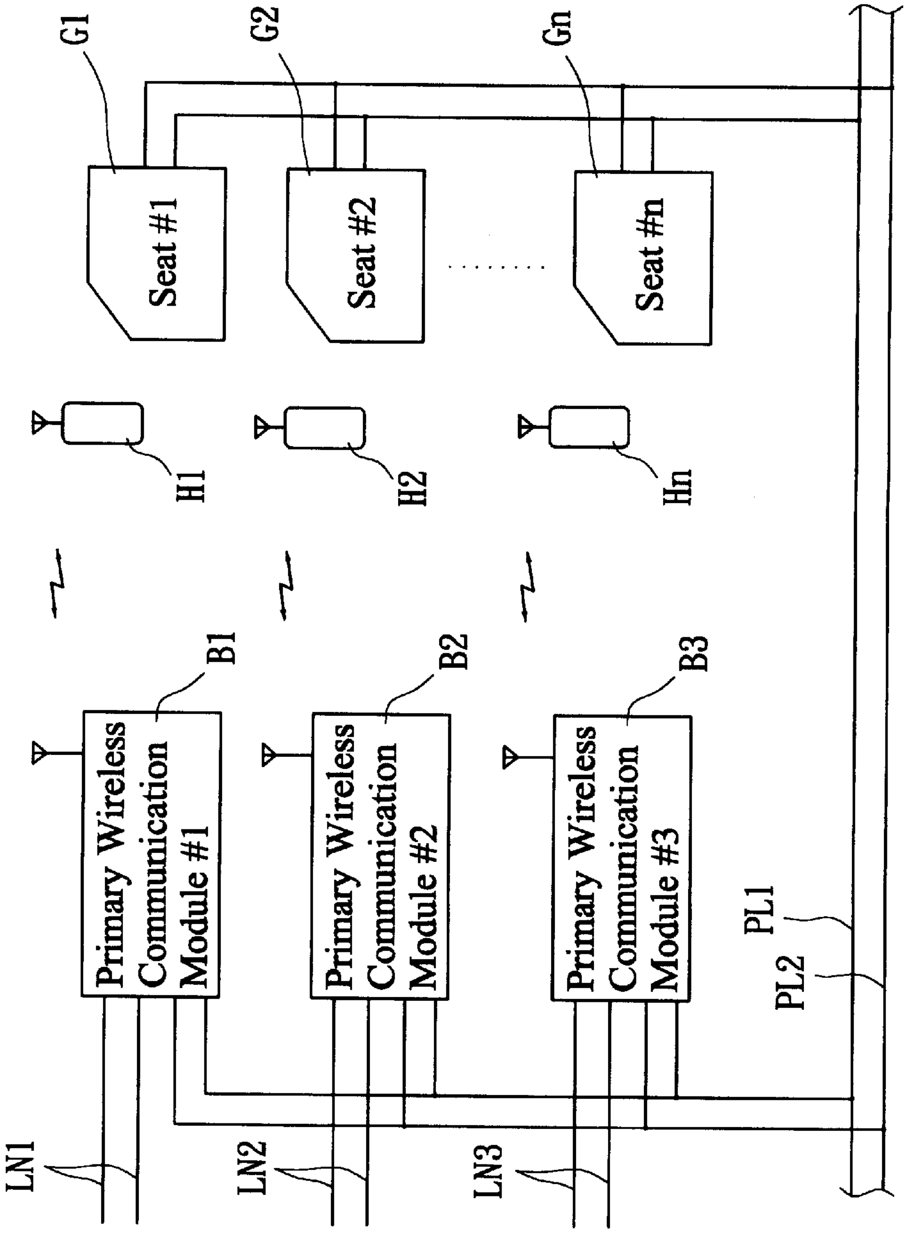
FIG. 1 is a system block diagram in accordance with the present invention.

Referring to FIG. 1, a system block diagram in accordance with a preferred embodiment of the present invention is shown. In this embodiment, three primary wireless communication modules B1, B2, B3, three secondary wireless communication modules H1, H2, H3, and a plurality of seats G1~Gn are taken as an example for explanation purpose. The primary wireless communication modules B1, B2, and B3 may be wireless base stations of a telephone system, and the secondary wireless communication modules H1, H2, and H3 may be wireless handsets of the telephone system. The secondary wireless communication modules H1~Hn may be placed on the seats G1~Gn respectively.

The primary wireless communication modules B1, B2, and B3 are connected to communication lines LN1, LN2, and LN3 of a communication system. The communication line may be a subscriber line, a data communication line, or a data bus. Further, the primary wireless communication modules B1, B2, and B3 are connected to electric power lines PL1 and PL2 serving as data link medium.

The secondary wireless communication modules H1 Hn may be placed on the seats G1~Gn respectively. Each of the seats is also connected to electric power lines PL1 and PL2.

Alternatively, the communication system of the present invention may include three primary wireless communication modules B1~B3 connected by electric power lines PL1 and PL2 and a plurality of secondary wireless communication modules H1, H2, and H3, without need of seats G1~Gn.

Figure 2:
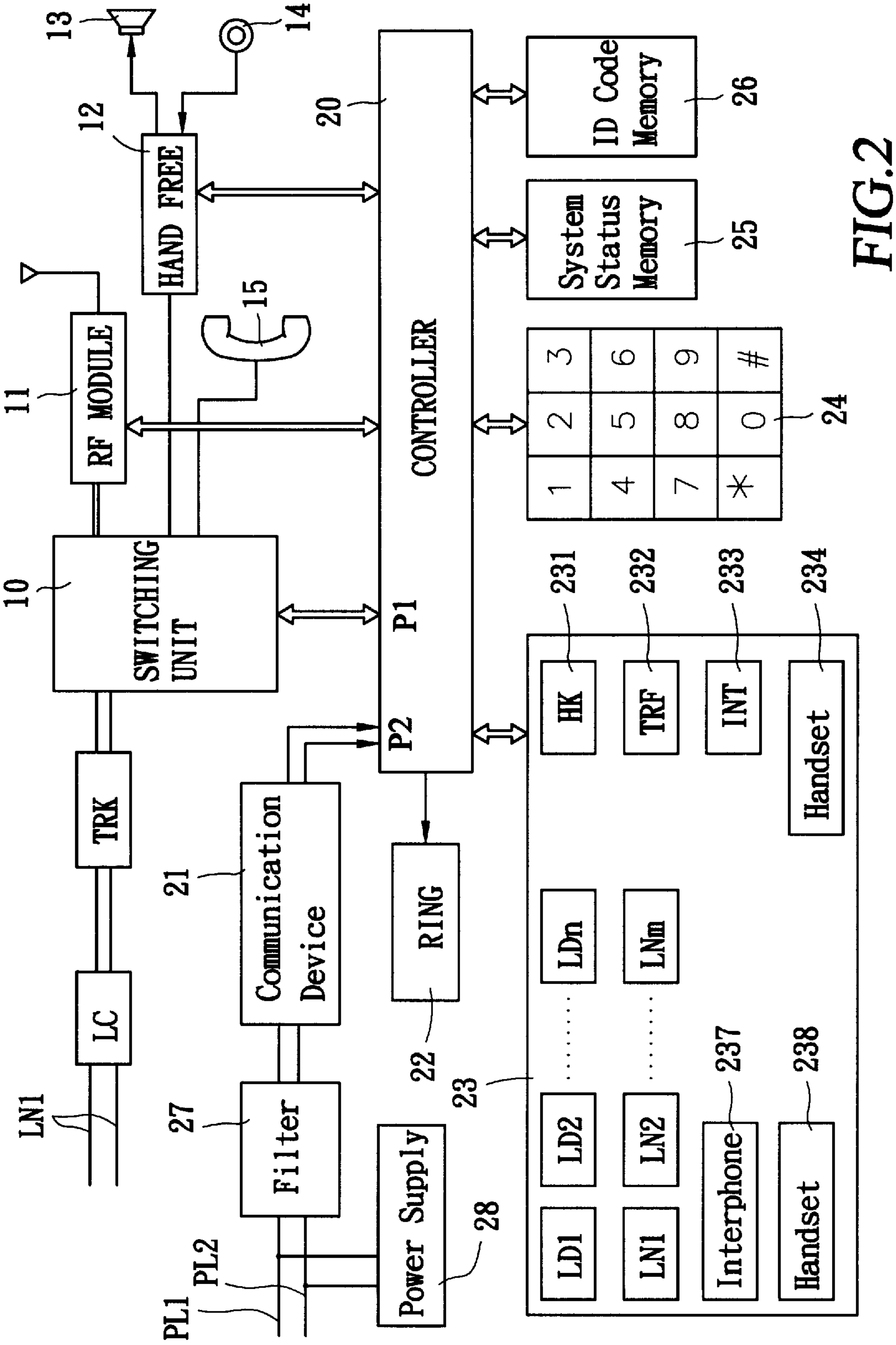
FIG. 2 is a schematic circuit diagram of the primary wireless communication module of FIG. 1.

FIG. 2 shows a schematic circuit diagram of the primary wireless communication module of FIG. 1. The primary wireless communication module, such as the first primary wireless communication module B1, comprises a switching unit 10 which is connected to the communication lines LN1 and LN2 via a two-way trunks TRK and a line circuits LC of an End Office Switching Network of the communication system. The switching unit 10 is connected to a communication port P1 of a controller 20. Alternatively, the primary wireless communication module may be a wireless network base-site, and the secondary wireless communication module may be a wireless network sub-site, and the communication system may be a wireless network system.

The switching unit 10 is connected to a RF module 11 composed of an analog or digital typed transmitter and receiver for transmitting and receiving RF signal. Under the control of the controller 20, via the transmitter and receiver, the RF module 11 is able to execute the function of communication with the secondary wireless communication module. The switching unit 10 is additionally equipped with a conventional hand free unit 12, a speaker 13, a microphone 14 and a handset 15.

The controller 20 is provided with a data link port P2 connected to a DSP communication device 21 as a data communication channel among the primary wireless communication modules. In this embodiment, the DSP communication device 21 is connected to electric power lines PL1–PL2 via a filter 27.

The controller 20 is also connected with a ringing unit 22 providing a ringing function for the primary wireless communication module. The controller 20 of the primary wireless communication module comprises a status control/display panel 23 inside which a hook key (HK) 231, a call-forward or transfer (TRF) key 232, an interphone (INT) key 233 and a baseto-handset (Handset) key 234 are provided. Each of the keys may associate with an indicator to show the status thereof. The hook key 231 is activated when the handset 15 is picked up to for example answer a call or originate a call. The call-forward key (TRF) 232 is operated to forward a call that is received from one primary wireless communication module to another primary wireless communication module or one of the secondary wireless communication modules. The interphone key (INT) 233 is for communication between two primary wireless communication modules and is associated with an interphone indicator 237. The base-to-handset (Handset) key 234 is to provide communication between the primary wireless communication module and one of the secondary wireless communication modules and is associated with a Handset indicator 238.

Each of the base stations is also provided with a plurality of subscriber line keys LN1, LN2, . . . , LNm and associated subscriber line indicators LD1, LD2, . . . , LDm to indicate busy/idle state of the respective subscriber lines. Also, the controller 20 is connected with a standard dialing key arrangement 24 which is connected to the controller 20 for a user to dial and generate dual-tone frequency signals necessary for the communication network.

Furthermore, the controller 20 is also connected with a system status memory 25 for storing system status data, such as the use of the communication channels and the information related to the subscriber lines. The controller 20 is additionally connected to an identification code memory 26 for storing the identification codes of each primary wireless communication module and secondary wireless communication module. Preferably, the identification code memory 26 is embodied by a permanently erasable memory. For example, the identification code memory 26 can be an EEPROM, a FLASH ROM or a Battery Backup RAM. The controller 20 reads the system status information stored in the system status memory 25 and reads the identification codes stored in the identification code memory 26 to control the operation of the RF module 11, the switching unit 10 and other devices. A power supply device 28 is used to supply a working power source to the primary wireless communication module.

Figure 3:
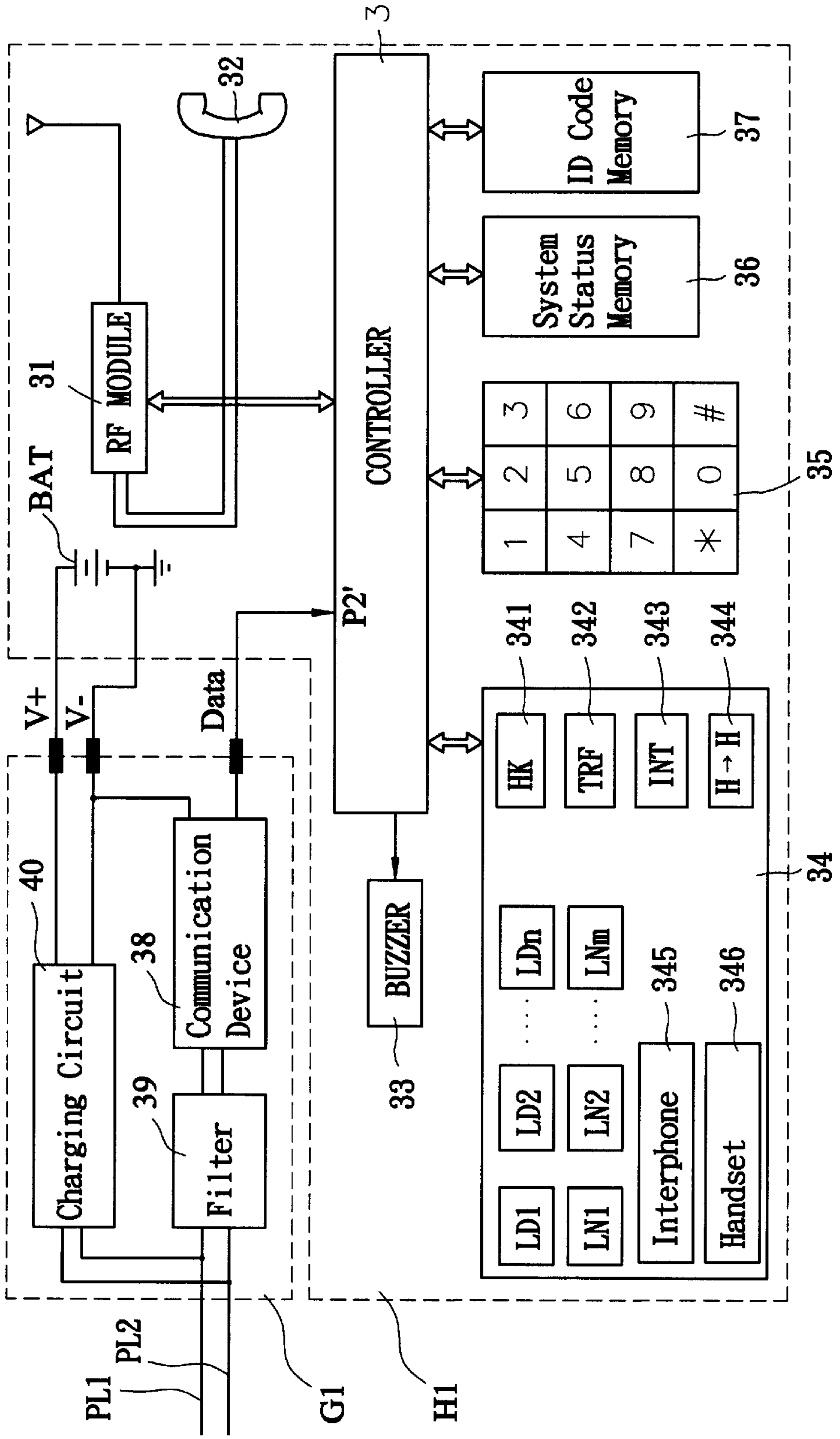
FIG. 3 is a schematic circuit diagram of the remote module of FIG. 1.

FIG. 3 shows a schematic circuit diagram of the secondary wireless communication module of FIG. 1. As shown, the secondary wireless communication module H1 comprises a controller 3, a RF module 31, a handset 32, and a buzzer 33. The RF module 31 includes a transmitter and a receiver therein. The transmitter has multiple selectable transmission channels and the selection of the transmission channel is done by the controller 3 to allow each specific secondary wireless communication module to establish a communication channel with the RF module of any of the primary wireless communication module.

The controller 3 of each of the secondary wireless communication module H1 also comprises a status control/display panel 34 inside which a hook key 341, a call-forward key (TRF) 342, an interphone key (INT) 343 and a handset-to-handset key (H→H) 344 are provided. Each key may associate with an indicator to show the status thereof. The hook key 341 is activated when the handset 32 is picked up to for example answer a call or originate a call. The call-forward key 342 is operated to forward a call that is received from one the primary wireless communication modules or another secondary wireless communication modules. The interphone key 343 is for communication between secondary wireless communication module and primary wireless communication module and is associated with an interphone indicator 345. The handset-to-handset key 344 is to provide communication between the secondary wireless communication modules and is associated with a Handset indicator 346.

The status control/display panel 34 also includes a plurality of subscriber line keys LN1, LN2, . . . , LNm and associated subscriber line indicators LD1, LD2, . . . , LDm to indicate busy/idle state of the respective subscriber lines.

Also, each handset unit includes a standard dialing key arrangement 35 connected to the controller 3 for a user to dial and generate dual-tone frequency signals necessary for the communication network. In addition, when making an interphone, the dialing key arrangement 35 can be used to key in the identification codes of the subject secondary wireless communication module and primary wireless communication module to communicate with.

Furthermore, the controller 3 is also connected with a system status memory 36 for storing system status data, such as the use of the communication channels and the information related to the subscriber lines. The controller 3 is additionally connected to an identification code memory 37 for storing the identification codes of each primary wireless communication module and secondary wireless communication module. Preferably, the identification code memory 37 is embodied by a permanently erasable memory. For example, the identification code memory 37 can be an EEPROM, a FLASH ROM or a Battery Backup RAM.

The controller 3 reads the system status information stored in the system status memory 36 and reads the identification codes stored in the identification code memory 37 to control the operation of the RF module 31, and other devices.

A rechargeable battery BAT is used to supply a working power source to the secondary wireless communication module. A charging circuit 40 may be arranged in the seat, such as the first seat G1 shown in FIG. 1, for supplying a charging power energy to the rechargeable battery BAT via a positive power source terminal V+ and a negative power source terminal V−.

The controller 3 of the secondary wireless communication module is connected to electric power lines PL1 and PL2 via a data communication device 38 and a filter 39. The data communication device 38 has a first terminal electrically coupled to the negative power source terminal V−, and a second terminal connected to a data link port P2' of the controller 3 via a data terminal DATA.

Figure 4:
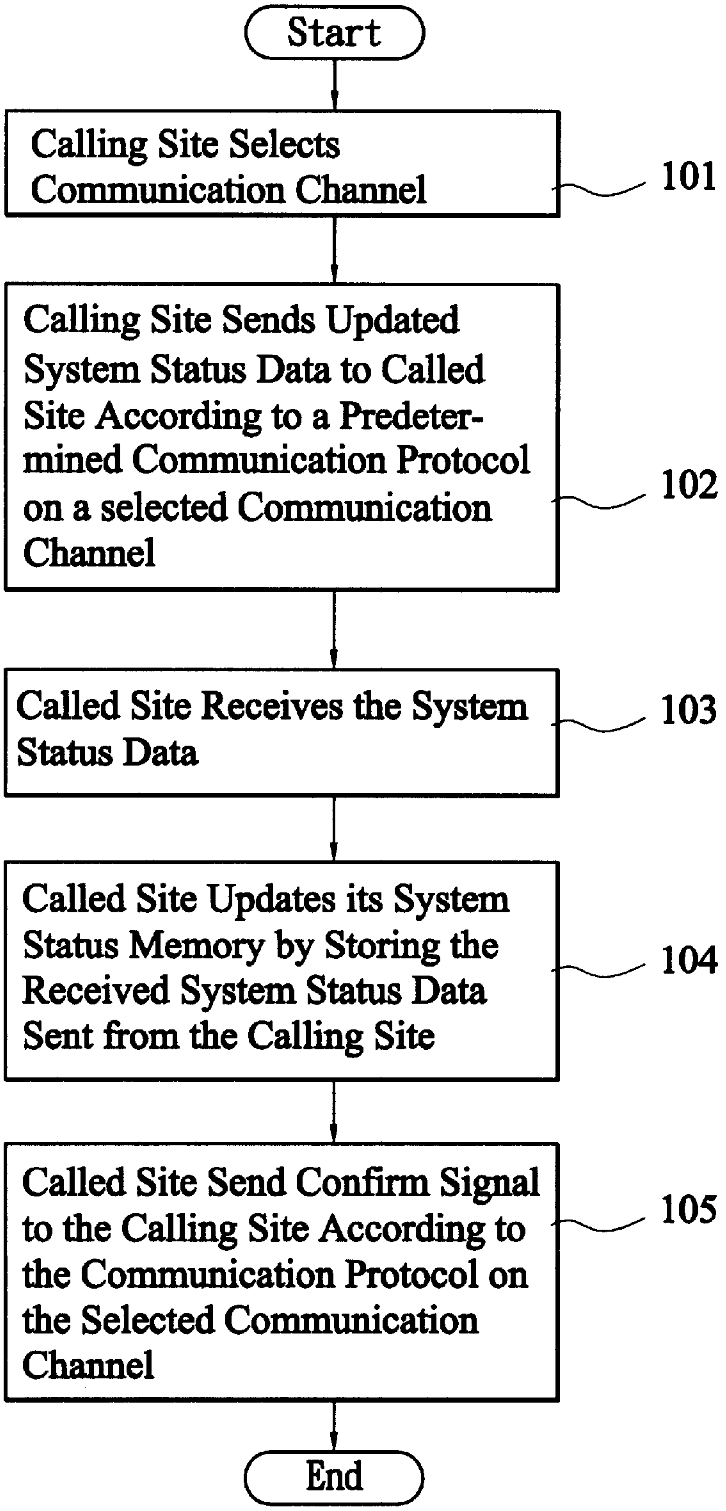
FIG. 4 is a flow chart of the present invention.

FIG. 4 is a flow chart of the present invention. At first, in step 101, a calling site selects a communication channel for performing communication with a called site. The calling site may be a calling primary wireless communication module or secondary wireless communication module, and the called site may be a called primary wireless communication module or secondary wireless communication module.

In step 102, the calling site sends its updated system status data or system maintenance information to the called site according to a predetermined communication protocol and transmitting method on a selected communication channel. The transmitting method may be a known Time Slot or Collision and Resend approach.

In step 103, the called site receives the system status data and/or system maintenance information transmitted from the calling site.

In step 104, the called site updates its system status memory by storing the received system status data and/or system maintenance information sent from the calling site, so as to synchronize the system data between the calling site and the called site.

In step 105, the called site sends a confirm signal to the calling site according to the predetermined communication protocol and transmitting method on the selected communication channel. As described above, the transmitting method may be a known Time Slot or Collision and Resent approach.

By means of the configuration of the present invention and the processes above, the system status data and/or system maintenance information may be transmitted among any one of the primary wireless communication modules and the secondary wireless communication modules, and between the primary wireless communication modules and the secondary wireless communication modules, by using the electric power line as data link network. So, the system data base of each primary wireless communication module and the secondary wireless communication module may be synchronized.

The electric power line coupled among the primary wireless communication modules and the secondary wireless communication modules may carry one or at least one frequency band and establish one or at least one communication channel thereon. The system status data may include the communication line using status, system operation status, and indicators status of the primary wireless communication modules and the secondary wireless communication modules.

The data communication device used in the primary wireless communication modules and the secondary wireless communication modules may be a Digital Signal Processing (DSP) cord communication device, such as DTMF, FSK, PSK, QAM, ASK, etc. Besides, the filter used in the primary wireless communication modules and the secondary wireless communication modules may be a high pass filter or a band pass filter.

It is apparent that although the present invention is illustrated with the description of a preferred embodiment of the system in accordance with the present invention, it is contemplated that there may be changes and modifications in the described embodiment and examples that can be carried out without departing from the scope of the invention which is intended to be limited only by the appended claims

What is claimed is:

1. A wireless communication system by using an electric power line as a data link network, comprising;

a plurality of primary wireless communication modules, each of which further comprising:

a controller having a data link port and a communication port connected to a communication line of a communication system;

a data communication device coupled to the data link port of the controller;

a filter coupled between the data communication device and the electric power line;

a system status memory coupled to the controller for storing an individual system status data of the primary wireless communication module; and a plurality of secondary wireless communication modules communicating with the primary wireless communication modules; wherein the system status memories of the primary wireless communication modules are synchronized to each other by transmitting the system status data therebetween according to a predetermined communication protocol on a selected communication channel through the electric power line.

2. The wireless communication system as claimed in claim 1, wherein the electric power line carries at least one frequency band and at least one communication channel.

3. The wireless communication system as claimed in claim 1, wherein the primary wireless communication module is a wireless base station of a telephone system, and the communication system is a public telecommunication network.

4. The wireless communication system as claimed in claim 1, wherein the primary wireless communication module is a wireless network base-site of a wireless network system, the secondary wireless communication module is a wireless network sub-site, and the communication system is a data network.

5. The wireless communication system as claimed in claim 1, wherein the system status data comprises a communication line using status, and a system operation status of the primary wireless communication modules and the secondary wireless communication modules.

6. The wireless communication system as claimed in claim 1, wherein the data communication device is a digital signal processing device (DSP) comprising DTMF, FSK, PSK, QAM, and ASK device.

7. The wireless communication system as claimed in claim 1, wherein the filter is a high pass filter.

8. The wireless communication system as claimed in claim 1, wherein the filter is a band pass filter.

9. A wireless communication system by using an electric power line as a data link network, comprising;

a plurality of primary wireless communication modules, each of which further comprising:

a controller having a data link port and a communication port connected to a communication line of a communication system;

a data communication device coupled to the data link port of the controller;

a filter coupled between the data communication device and the electric power line;

a system status memory coupled to the controller for storing a system status data of the primary wireless communication module;

a plurality of secondary wireless communication modules communicating with the primary wireless communication modules, each of which further comprising:

a controller having a data link port;

a system status memory coupled to the controller for storing a system status data of the seconday wireless communication module; and a plurality of seats, each of which being mounted with a secondary wireless communication module, further comprising:

a data communication device coupled to the data link port of the controller of the secondary wireless communication module;

a filter coupled between the data communication device and the electric power line;

wherein the system status memories of the primary wireless communication modules and the secondary wireless communication modules are synchronized to each other by transmitting the system status data therebetween according to a predetermined communication protocol on a selected communication channel through the electric power line.

10. The wireless communication system as claimed in claim 9, wherein the electric power line carries at least one frequency band and at least one communication channel.

11. The wireless communication system as claimed in claim 9, wherein the primary wireless communication module is a wireless base station of a telephone system, and the communication system is a public telecommunication network.

12. The wireless communication system as claimed in claim 9, wherein the primary wireless communication module is a wireless network base-site of a wireless network system, the secondary wireless communication module is a wireless network sub-site, and the communication system is a data network.

13. The wireless communication system as claimed in claim 9, wherein the system status data comprises a communication line using status, and a system operation status of the primary wireless communication modules and the secondary wireless communication modules.

14. The wireless communication system as claimed in claim 9, wherein the data communication device is a digital signal processing device (DSP) comprising DTMF, FSK, PSK, QAM, and ASK device.

15. The wireless communication system as claimed in claim 9, wherein the filter is a high pass filter.

16. The wireless communication system as claimed in claim 9, wherein the filter is a band pass filter.

* * * * *